United States Patent
Biglari et al.

(10) Patent No.: US 11,205,987 B1
(45) Date of Patent: Dec. 21, 2021

(54) HYBRID ELECTRIC VARIABLE SPEED DRIVE

(71) Applicant: Geocent, LLC, Metarie, LA (US)

(72) Inventors: Haik Biglari, Huntsville, AL (US); David Young, Madison, AL (US); Nicolas Mateo, Huntsville, AL (US); Matthew Owney, Merritt Island, FL (US)

( * ) Notice: Subject to any disclaimer, the term of this patent is extended or adjusted under 35 U.S.C. 154(b) by 229 days.

(21) Appl. No.: 16/741,387

(22) Filed: Jan. 13, 2020

(51) Int. Cl.
| | |
|---|---|
| *H02P 27/08* | (2006.01) |
| *B60W 10/08* | (2006.01) |
| *H02P 27/14* | (2006.01) |
| *H02M 7/5395* | (2006.01) |
| *F04B 49/06* | (2006.01) |

(52) U.S. Cl.
CPC .......... *H02P 27/085* (2013.01); *B60W 10/08* (2013.01); *F04B 49/065* (2013.01); *H02M 7/5395* (2013.01); *H02P 27/14* (2013.01)

(58) Field of Classification Search
CPC ....... H02P 27/085; H02P 27/14; B60W 10/08; H02M 7/5395; F04B 49/065
See application file for complete search history.

(56) References Cited

U.S. PATENT DOCUMENTS

| | | | | |
|---|---|---|---|---|
| 9,590,540 B2* | 3/2017 | Wu | ............... | H02M 1/12 |
| 2013/0278182 A1* | 10/2013 | Perisic | ............... | B60L 15/025 |
| | | | | 318/400.02 |
| 2014/0024490 A1* | 1/2014 | Bangura | ............... | B60L 7/14 |
| | | | | 477/3 |

OTHER PUBLICATIONS

Author: Ned Mohan Title: Advanced Electric Drves—Analysis, Control and Modeling using Simulink Copyright Year: 2001 ISBN: 0-9715292-0-5.
Author: Vedam Subrahmanyam Title: Electric Drives—Concepts and Applications Copyright Year: 1996 ISBN: 0-07-460370-1.
Author: Richard Valentine Title: Motor Control Electronics Handbook Copyright Year: 1998 ISBN: 0-07-066810-8.

\* cited by examiner

*Primary Examiner* — Muhammad S Islam
*Assistant Examiner* — Devon A Joseph
(74) *Attorney, Agent, or Firm* — Andrew G. Vicknair (57) ABSTRACT

A specialized variable speed drive of the present invention is capable of controlling a motor and increasing the efficiency of both an ACIM or DCBL motor by biasing operation in favor of a class AB mode. The variable speed drive may be configured with two gate drivers where one gate driver is a class D gate driver and the second gate driver is either a class AB gate driver or a class C gate driver. The system also operates to reduce electro-magnetic interference in the operation of motors while increasing the reliability of the overall VSD system.

24 Claims, 7 Drawing Sheets

Figure 7

HYBRID ELECTRIC VARIABLE SPEED DRIVE

GOVERNMENT LICENSE RIGHTS

This invention was made with government support under Contract 80MSFC18C0011 awarded by NASA. The government has certain rights in the invention.

CROSS REFERENCE TO RELATED APPLICATIONS

This application does not claim the benefit of any prior filed applications.

TECHNICAL FIELD

The present invention relates, in general to variable speed drives, and more particularly to a high efficiency hybrid variable speed drive.

BACKGROUND OF INVENTION

Currently, variable speed drives (VSD) sometimes referred to as variable frequency drives are helpful in managing energy in certain processes. VSDs often involve a three-phase AC induction motor and a variable frequency power supply. These VSDs are helpful in that they can vary the speed of a normally fixed speed motor. For example, a VSD can be used in an HVAC system to control fan speeds as opposed to using dampers to control air volume.

The VSD can also be used to adjust the frequency and voltage of power to a motor which will ultimately vary the speed of the motor. VSDs can also take a fixed frequency AC power supply and convert it into a variable frequency AC supply which will control the power usage and allow the motor to run at a desirable speed. While VSDs can help in controlling power usage, there is still the need to further reduce energy consumption and reduce electromagnetic interference in various applications.

Accordingly, a need exists in the art for a VSD system capable of controlling motor speeds, reducing energy needs, and providing extended component life while at the same time increasing energy efficiency and reducing the emission of electromagnetic interference. For example, there is a need for reducing wasted energy in certain applications, such as terrestrial and space based applications when the primary power source is provided by batteries.

BRIEF SUMMARY OF THE INVENTION

The present invention is directed to a specialized VSD system that will increase energy efficiency, reduce the emission of electromagnetic interference, and increase the life of various components. Such a system will ultimately increase energy availability of battery powered systems in various environments, such as space-based applications or battery operated terrestrial electrical motors, such as automobiles and other types of transportation systems.

According to one embodiment of the present invention, the VSD system uses a Field Oriented Control (FOC) algorithm to control an Alternating Current Induction Motor (ACIM) whereby some of the components of the VSD system such as a gate driver and a bridge are integrated using three (3) PA93 high voltage, low quiescent current MOSFET operational amplifiers.

The foregoing has outlined rather broadly the features and technical advantages of the present invention in order that the detailed description of the invention that follows may be better understood. Additional features and advantages of the invention will be described hereinafter, which form the subject of the invention. It should be appreciated that the conception and specific embodiment disclosed may be readily utilized as a basis for modifying or designing other structures for carrying out the same purposes of the present invention. It should also be realized that such equivalent constructions do not depart from the invention. The novel features which are believed to be characteristic of the invention, both as to its organization and method of operation, together with further objects and advantages will be better understood from the following description when considered in connection with the accompanying figure(s). It is to be expressly understood, however, that each of the figure(s) is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The present invention is directed to a hybrid variable speed drive (VSD) system that can be used to improve efficiency and reliability while also reducing wasted energy utilizing the VSD and extending the life of components, such as a bridge. The system can also reduce the emission of electromagnetic interference and increase component life so that in a battery powered system the life of energy availability will be increased while increasing the reliability of the overall VSD system. The reduction of conducted and radiated emission is important in certain applications, such as the space and defense industries.

Referring now in more detail to the drawings, the present invention will now be described in more detail.

Figure 1:
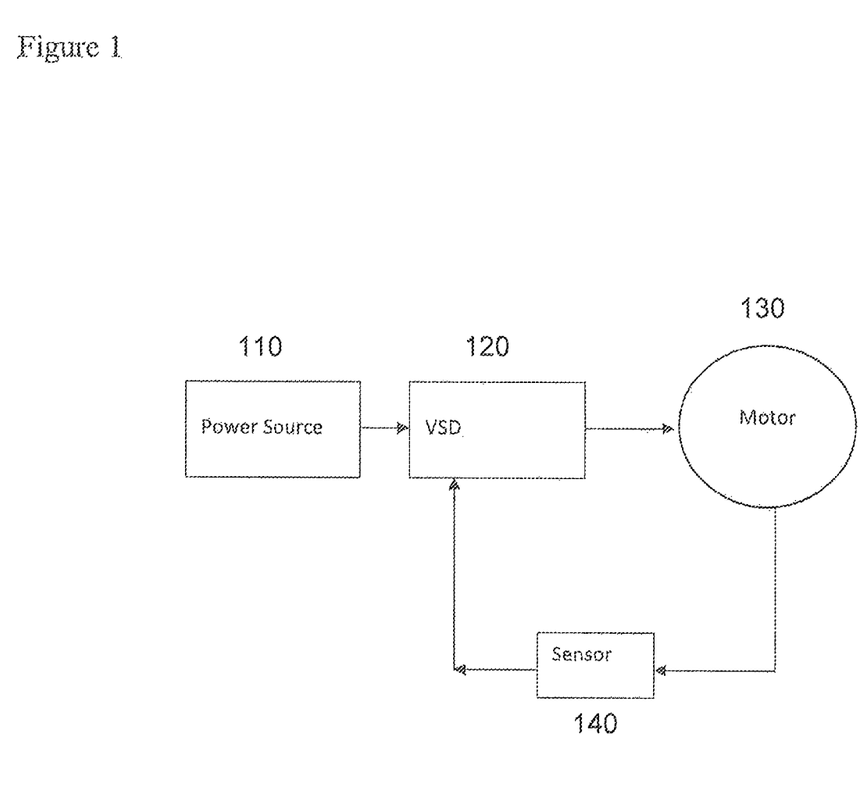
FIG. 1 is an illustration of a top-level diagram of the present invention.

FIG. 1 illustrates a basic top-level diagram of the present invention VSD 120 to be used with a motor. VSD 120 set forth herein can be used to support 3-phase electromotors of both direct current brushless (DCBL) or alternating current induction motors (ACIM) types. VSD 120 may also be used with a permanent magnet synchronous motor (PMSM). When VSD 120 is used with an ACIM, various algorithms may be used with VSD 120 in the operation and control of VSD 120 including use of a V/Hz algorithm or a Field Oriented Control (FOC) algorithm. While a V/Hz algorithm can be used with an ACIM, it will not be used with a DCBL motor.

Power source 110 illustrates the power source applied/input to the VSD. The power source 110 could come from any number of sources, such as a battery or power supply. Power source 110 supplies power to VSD 120 which will then supply power to motor 130. In one embodiment of the present invention, power source 110 may be configured so that two different voltages are output and supplied to VSD 120. In such an embodiment, power source 110 can output a low voltage to power low voltage components within VSD 120 and a high voltage that will be used to power motor 130. In one embodiment, the low voltage may be 5 Vdc and the high voltage may be 230 Vdc. In one embodiment, the high voltage may be a +/−200 Vdc that will be used by VSD 120. The present invention is not limited to these values as alternative embodiments may be configured so that the low and high voltages output by power source 110 may be different than the 5 Vdc and 230 Vdc values.

In one embodiment of the present invention, sensor 140 may be used to measure any number of characteristics of motor 130. For example, sensor 140 may be any number of sensors capable of sensing/measuring the RPMs of motor 130, the speed of motor 130, the angular speed of motor 130 and the torque of motor 130. In a preferred embodiment, the present invention is configured so that sensor 140 is configured to provide any number of measurements to VSD 120, such as the angular speed and torque of motor 130. These measurements may then be used by VSD 120. In one embodiment, VSD 120 may use measurements taken by sensor 140 to determine how motor 130 is controlled. In one embodiment, when VSD 120 is used with a DCBL motor, sensor 140 may be a rotor position sensor or encoder and a current sensor to measure the current of two phases. The rotor position sensor will provide information to VSD 120 so that the controller may energize the stator coil at the right time to maximize the motor output power. The current sensor in measuring the current can provide information about the torque being exerted at the rotor shaft by the stator. Sensor 140 is optional and may not be utilized in every embodiment. In an embodiment, where VSD 120 may be utilizing a Field Oriented Control (FOC) algorithm with an Alternating Current Induction Motor (ACIM) motor or a Direct Current Brushless (DCBL) motor, sensor 140 will not be used as the sensing may be done internally at the output of VSD 120 by measuring current and voltages of some or all phases. In addition, the present invention may be configured so that VSD 120 may operate without sensor 140 for both V/Hz algorithm and FOC algorithm and for both an ACIM and DCBL motors.

Figure 2:
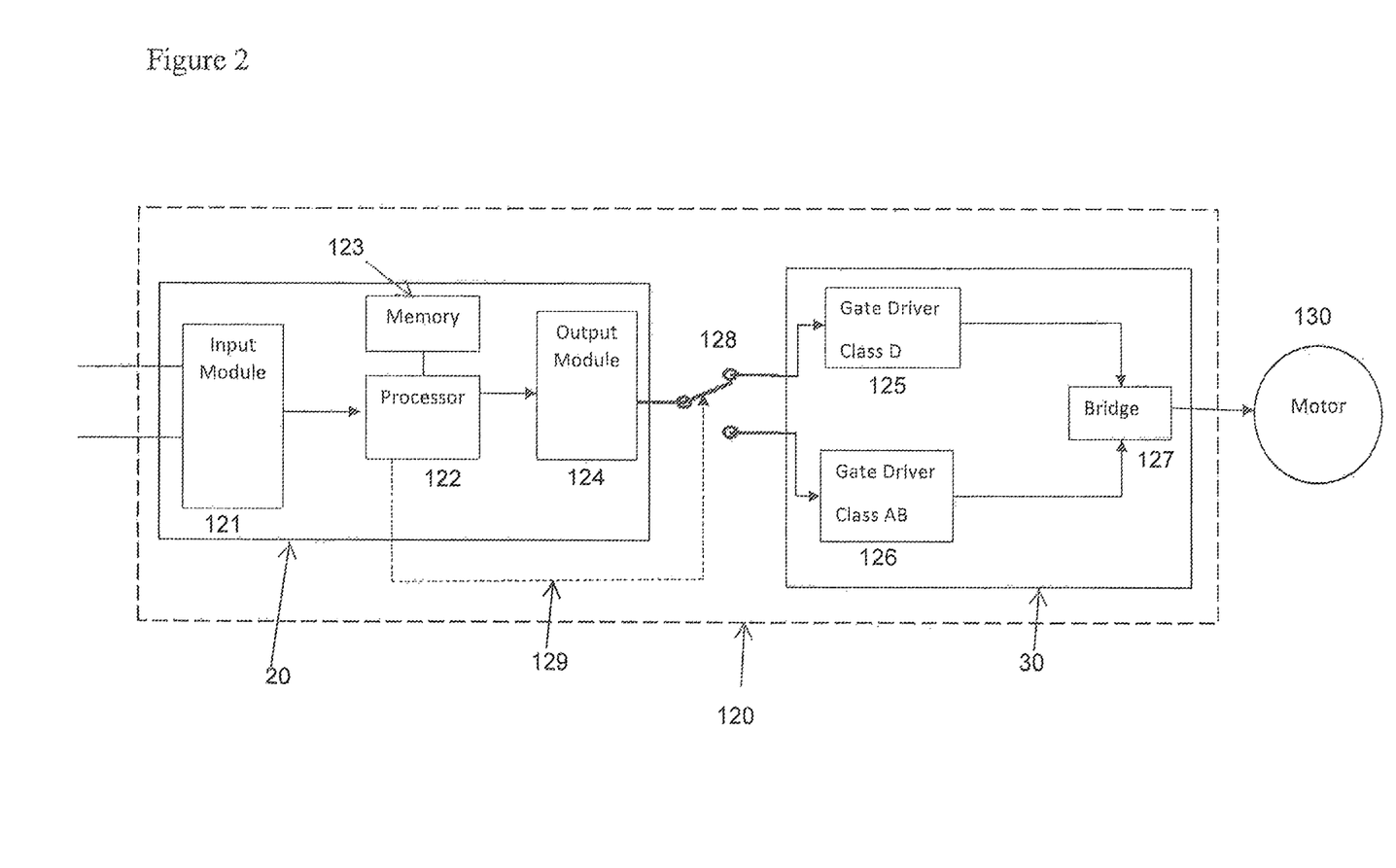
FIG. 2 is an illustration of a block diagram of an embodiment of present invention illustrating components of a variable speed drive.

FIG. 2 illustrates a block diagram illustrating the components of VSD 120. As illustrated in FIG. 2, in one embodiment of the present invention, VSD 120 may be configured with an embedded system block 20 and hardware block 30. Block 20 may be configured to include an input module 121, processor module 122, memory module 123, and output module 124. Hardware block 30 may be configured to include only hardware components including a first gate driver 125, a second gate driver 126, and a bridge 127. In one embodiment, first gate driver 125 is a class D gate driver and second gate driver 126 is a class AB gate driver. In another embodiment, the present invention may be configured so that second gate driver 126 is a class C gate driver. The VSD 120 will be described herein with reference to the second gate driver 126 being a class AB gate driver. However, the present invention is not limited to use of only the class AB gate driver as the second gate driver 126 as a class C gate driver can be used as the second gate driver. In one embodiment, the class AB gate driver 126 and one leg of bridge 127 may be integrated into a chip, such as a PA93 high voltage, low quiescent current MOSFET operational amplifier. In such an embodiment, where three phase power is needed to drive a motor, three chips, such as three PA93 operational amplifiers, may be used to provide three phase power to the motor. In a situation where VSD 120 is used to control a single phase motor, a single chip, or single PA93 operational amplifier, may be used to provide power to a single phase motor. In one embodiment, the PA93 operational amplifier can also provide class C amplification which can further increase the efficiency so that the system is more efficient than with the use of the class AB scheme with the class AB gate drivers. Thus, in such an embodiment, class C amplification can be provided by the PA93 operational amplifier. The present invention is not specifically limited to this configuration as embedded system block 20 and hardware block 30 may be configured with different components in other embodiments.

In one embodiment, VSD 120 is configured with at least one processor 122 with memory 123 and various software may be stored in the memory 123 so that processor 122 can access and run software in memory 123 in VSD 120 including various types of software such as the V/Hz or FOC algorithms. The present invention is not limited to use of the V/Hz or FOC algorithms as other algorithms may be used as well. VSD 120 also includes an input module 121 capable of receiving various inputs and configured so that processor 122 can access and use the inputs with the various software running on the processor. In one embodiment, input module 121 can be implemented in a field-programmable gate array (FPGA) or discrete electronic components. As illustrated in FIG. 2, VSD 120 may also be configured with output module 124 that may function to generate various outputs or signals to be transmitted to gate drivers 125 and 126. In one embodiment, output module 124 may be field-programmable gate array (FPGA) based. As illustrated in FIG. 2, VSD 120 may be configured with a switch 128 that is used to control the outputs from output module 124 as only one gate driver of gate drivers 125 and 126 can be active at a time. The present invention may be configured so that switch 128 may be included within system block 20 or the present invention may be configured so that it is not part of block 20, but a separate component or part of block 30. Switch 128 is controlled by processor 122 as illustrated by dotted line 129 that represents a link between processor 122 and switch 128. Thus, depending upon the algorithm running on processor 122 and how processor 122 is going to control motor 130, output module 124 will output a signal to either class D gate driver 125 or class AB gate driver 126, but gate drivers 125 and 126 will not be active at the same time. The present invention may also be configured so that output module 124 is capable of generating any number of signals such as a 3-phase pulse width modulation (PWM) signal, a 3-phase sinusoidal signal, a trapezoidal signal, or any number of other signals. In alternative embodiments, the signals may be generated by processor 122 or other components, such as a sinusoidal oscillator.

The present invention may also be configured with a bridge 127. Bridge 127 may be configured to convert a high power DC supply to an AC power to operate motor 130. In one embodiment, the present invention may be configured so that the high voltage supplied by power source 110 is connected to bridge 127 to supply power to motor 130 pursuant to the operation of the other components, such as processor 122 and class D gate driver 125 and class AB gate driver 126. Bridge 127 may be explicit as illustrated in FIG. 2 or it could be implicit when a chip, such as a PA93 high voltage, low quiescent current MOSFET operational amplifier is used to drive the motor 130, as further illustrated in FIG. 5. Gate drivers 125 and 126 operate to drive the gates of bridge 127. In other embodiments, gate drivers 125 and 126 may be explicit or separate components of VSD 120. For instance, when dealing with powers great than 5 KW, gate drivers 125 and 126 will be explicit and configured as separate components.

Input module 121 receives inputs and transmits those inputs to processor 122 so that processor 122 may analyze and process any number of inputs. Input module 121 may be configured to receive any number of inputs such as instructions and/or computer code from users that can be used to program and control VSD 120. In some embodiments, input module 121 may receive inputs from sensor 140. The present invention may be configured so that sensor 140 is an encoder or resolver that measures the angular speed ($\omega$) at the shaft of motor 130. Determining the angular speed is important as it assists in determining the position which it used by the VSD to energize the stator coils in a synchronous manner. In another embodiment, sensor 140 may measure the angular speed ($\omega$) by measuring pulses generated by a gear tooth connected to the shaft of motor 130. Sensor 140 may also be configured to measure the torque ($\tau$) of motor 130. In such an embodiment, the torque ($\tau$) of motor 130 may be measured with the use of a torque sensor that measures the torque at the shaft of motor 130.

In one embodiment, the present invention may be configured so that input module 121 receives the angular speed, and torque of motor 130 from sensor 140. Input module 121 may receive other inputs and the present invention is not limited to receiving only the angular speed, and torque of motor 130. These measurements can then be used by and processed by the processor 122 to determine what type of outputs will be generated by output module 124. These signals [angular speed ($\omega$), torque ($\tau$)] are transmitted to processor 122 in real-time so that the software running on processor 122 can execute such software based on the inputs from input module 121. In one embodiment, processor 122 processes the angular speed ($\omega$) and torque ($\tau$) to determine what type of amplification scheme, such as class AB or class D, should be used in operating and controlling motor 130 to obtain an efficient operation of motor 130. In determining what amplification scheme to use, VSD 120 is determining which gate driver out of class D driver 125 and class AB driver 126 will be used. In one embodiment, the VSD may operate whereby processor 122 decides to stay in Class AB mode or continue to use class AB driver 126 for reduced EMI (electromagnetic interference) emissions.

In determining the more efficient operation, processor 122 may take the input signals for angular speed ($\omega$) and torque ($\tau$) and multiply these two signals and then compare the product of the two, ($P_M$), with a pre-determined critical power level ($P_c$). The product of the angular speed ($\omega$) and torque ($\tau$), ($P_M$), is the mechanical power that is being delivered to the motor and that value is used by the processor 122 to determine how the VSD 120 should operate to create a more efficient operation of the motor 130.

In determining the more efficient operation, if the processor 122 determines that product ($P_M$) of the angular speed ($\omega$) and torque ($\tau$) is greater than a pre-determined critical power level ($P_c$), then processor 122 may generate a specific signal to output module 124 so that the class D driver 125 is used in controlling and operating motor 130. Output module 124 may then send the specifically generated signal to class D driver 125. In alternative embodiments, other devices, such as an oscillator may generate a signal that will be sent to class D driver 125. In one embodiment, an oscillator may generate a 3-phase sinusoidal signal that will be modulated on a high frequency square wave which will result in the generation of a Pulse Width Modulated (PWM) signal that will be sent to class D driver 125.

If processor 122 determines that product ($P_M$) of the angular speed ($\omega$) and torque ($\tau$) is less than the pre-determined critical power level ($P_c$), then processor 122 may generate a specific second signal to output module 124 so that the class AB driver 126 is used in controlling and operating motor 130. Output module 124 may then send the specifically generated signal to class AB driver 126. Thus, for the more efficient operation of motor 130, if product ($P_M$) of the angular speed ($\omega$) and torque ($\tau$) is less than a pre-determined critical power level ($P_c$), a signal will be sent to class AB driver 126 to operate the motor 130 and when the product ($P_M$) of the angular speed ($\omega$) and torque ($\tau$) is greater than a pre-determined critical power level ($P_c$), a signal will be sent to class D driver 125 to operate the motor 130 in order to achieve the more efficient operation. Use of class AB driver 126 is beneficial to increase the efficiency and reliability of the VSD system. Class AB scheme is also beneficial in that it can operate to prevent cogging normally associated with a Direct Current Brushless (DCBL) motor. The Class AB scheme and use of the class AB driver 126 is also well suited when controlling a permanent magnet synchronous motor (PMSM).

In one embodiment, when the product ($P_M$) of the angular speed ($\omega$) and torque ($\tau$) is greater than a pre-determined critical power level ($P_c$), VSD 120 may be configured so that a 3-phase pulse width modulated (PWM) signal is generated and sent to the class D gate driver 125. The PWM signal assists in conforming a signal width and controlling power delivery and the on-off behavior of the PWM signal changes the average power of the signal.

Figure 3:
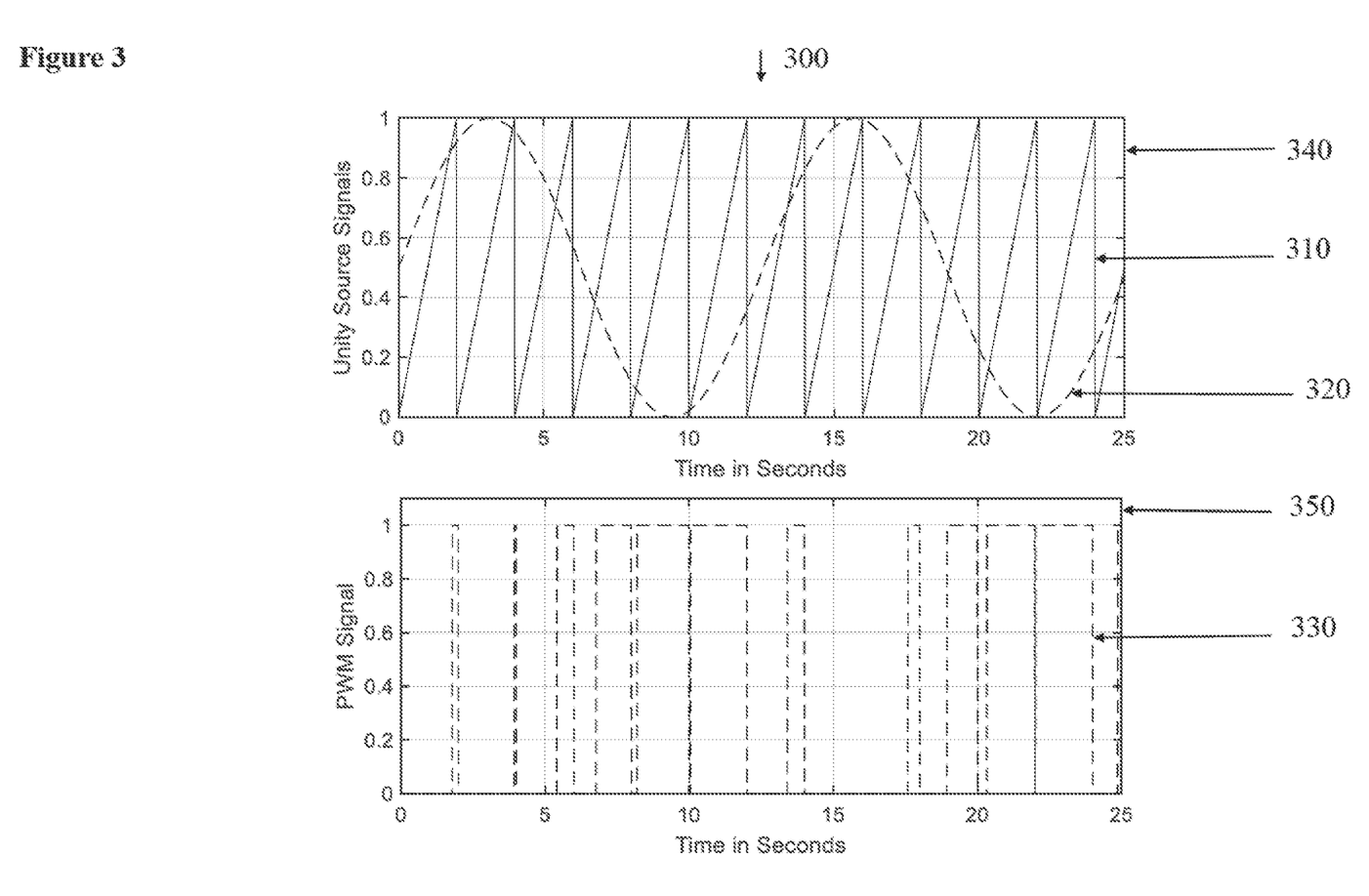
FIG. 3 is an illustration of the creation of the PWM signal through the intersective method.

In one embodiment of the present invention, an analog generation method or intersective method is used to generate the PWM signal based on a given signal. This intersective method allows for the creation of the PWM signal through simply noting the intersections between a sawtooth or triangular trigger signal and a reference sinusoid. FIG. 3 illustrates a sample illustration of the creation of the PWM signal through the intersective method with the source signals, 310 and 320, illustrated in the top half 340 of the graph 300. Source signal 320 is the analog signal (sinusoidal as shown) and source signal 310 is the sawtooth or trigger signal. The generated PWM signal 330 is illustrated in the bottom half 350 of the graph 300. The analog signal 320 is compared to the sawtooth signal 310 and when the sawtooth signal 310 is less than the analog signal 320, the PWM signal 330 is in the high state—represented by the 1 in FIG. 3—and when the sawtooth signal 310 is greater than the analog signal 320, the PWM signal 330 is in the off/low state—represented by the 0 in FIG. 3.

In one embodiment of the present invention, output module 124 may be configured with an application specific integrated circuit (ASIC) connected to processor 122 and used to generate the PWM signal 330 because the frequency of the PWM signal is in the range of tens of kHz. Thus, in one embodiment, the output module may include an ASIC device to generate the PWM signal.

In generating sinusoidal signals, three sinusoidal signals are generated which have the same frequency but have 120 degree phase difference between them. For signals to be sent to the Class AB Driver 126 for class AB amplification, the generated signal is sent directly to class AB driver 126 for amplification and for signals to be sent to class D driver 125, the generated sinusoidal signals are modulated on a square wave and resulting PWM signal is sent to class D driver 125 for amplification. The present invention utilizes a method/scheme to obtain accurate sinusoidal signals which will ultimately improve the efficiency of the VSD. In one embodiment, a three-phase (3-Ph) sinusoidal oscillator is used to provide desired signals regardless of the operational period. The method/scheme is preferably implemented through the MATLAB software language, which is executed in realtime, operating in VSD 120. The present invention is not limited to use of the MATLAB language as any programming language may be used. The 3-Ph oscillator will propagate the following differential equation:

$$dx/dt = A \cdot \omega \cdot x/2$$

In the following equation, x is the state vector, $\omega$ is the frequency in radians/second and the A matrix is a skew symmetric matrix with elements that belong to $\{-1, 0, 1\}$. The initial condition in the above equation is set to $[-0.5 -0.5\ 1.0]$. The above equation is then transformed to a difference equation via the Bilinear Transformation method as shown below:

$$X(n+1) = \text{inv}(2 \cdot I - 0.5 \cdot A \cdot \omega \cdot T) \cdot (2 \cdot I + 0.5 \cdot A \cdot \omega \cdot T) \cdot X(n)$$

When the present invention operates with the class D gate drivers, the PWM signal is generated and transmitted to the class D driver 125. The PWM signal will be used by the class D driver 125 to drive the gates of bridge 127. In addition, a deadband may be introduced into the signal processed by the class D driver 125 not to short the DC power bus.

When the product ($P_M$) of the angular speed ($\omega$) and torque ($\tau$) is less than a pre-determined critical power level ($P_C$) and when class AB driver 126 is used in controlling and operating motor 130, VSD 120 may be configured so that a 3-phase sinusoidal signal is generated and sent to the class AB gate driver 126. In an alternative embodiment, VSD 120 may generate a trapezoidal signal that may be sent to class AB gate driver 126. The present invention may also be configured so that when class AB driver 126 is used, a digital to analog converter will be used by the class AB gate driver. In such an embodiment, output module 124 may include the digital to analog converter or the digital to analog converter may be a separate component connected to output module 124. The digital to analog converter will take the digital sinusoidal signal generated by processor 122 and convert it to an analog value. Alternatively, the analog value may be produced by a sinusoidal oscillator which is commanded by the processor 122. This analog value is then used to drive class AB driver 126. The voltage output by the digital to analog converter may vary but in a preferred embodiment of the present invention, the amplitude range of the digital to analog converter may range from 0 to 3.2 volts with a frequency that will depend upon the desired angular speed ($\omega$) of motor 130. In alternative embodiments, the digital to analog converter may output other voltages. For example, the digital to analog converter may output a voltage range from −5 to +5 volts.

Figure 4:
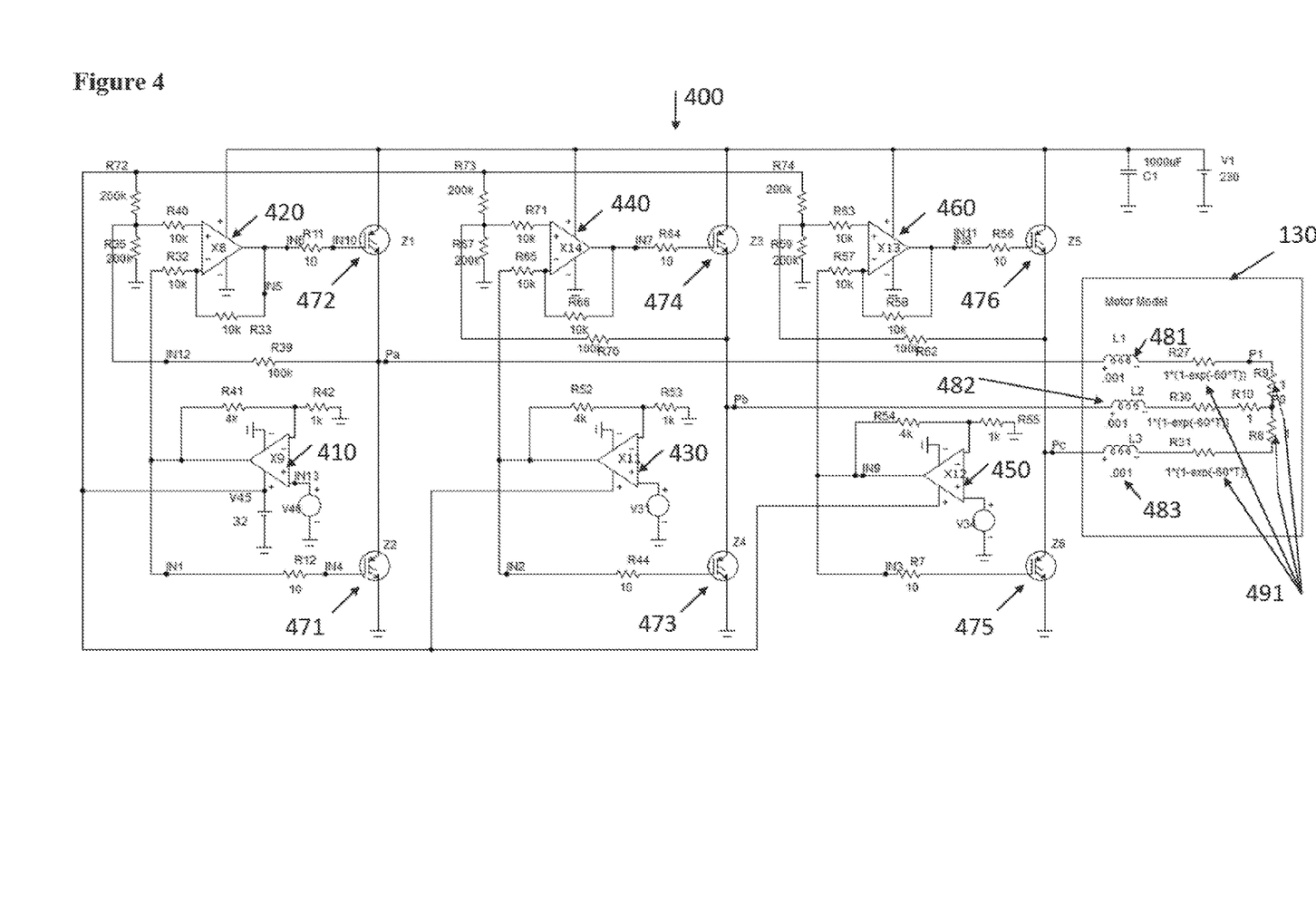
FIG. 4 is an illustration of a sample circuit diagram of an embodiment of a class AB gate driver of the present invention.

In one embodiment, the present invention may be configured so that the class AB gate driver 126 is configured of six (6) operational amplifiers. FIG. 4 illustrates a sample circuit diagram 400 which illustrates one embodiment of class AB gate driver 126 of the present invention, the bridge 127, and the motor 130. The circuit diagram 400 of FIG. 4 illustrates various circuit components and various details of the various components. The various details of the various component of diagram 400 are included for illustration purposes and are not limitations of the present invention as other component values and components may be used in other embodiments. As illustrated in FIG. 4, the class AB gate driver 126 may be configured with six (6) operational amplifiers illustrated by amplifiers 410, 420, 430, 440, 450, and 460. The bridge 127 may be configured with six (6) transistors, which may be MSOFET or IGBT type transistors, as illustrated by transistors 471, 472, 473, 474, 475, and 476. The operational amplifiers are preferably biased to drive the gates of bridge 127 or the transistors 471, 472, 473, 474, 475, and 476. Motor model 130 is illustrated in FIG. 4 by the inductors 481, 482, and 483 and the various resistors 491.

In processing data (inputs) from input module 121, processor 122 will determine which amplification scheme and thus which gate drive, class AB driver 126 or class D driver 125, will be utilized to drive bridge 127. In one embodiment, bridge 127 will include six high power transistors that will convert the high power DC supply to a 3 phase AC power source for motor 130. The gate drivers, class AB driver 126 or class D driver 125, both operate, not at the same time, to drive the gates within bridge 127 so that bridge 127 can convert the high power DC supply to a high power AC power supply to energize motor 130.

Figure 5:
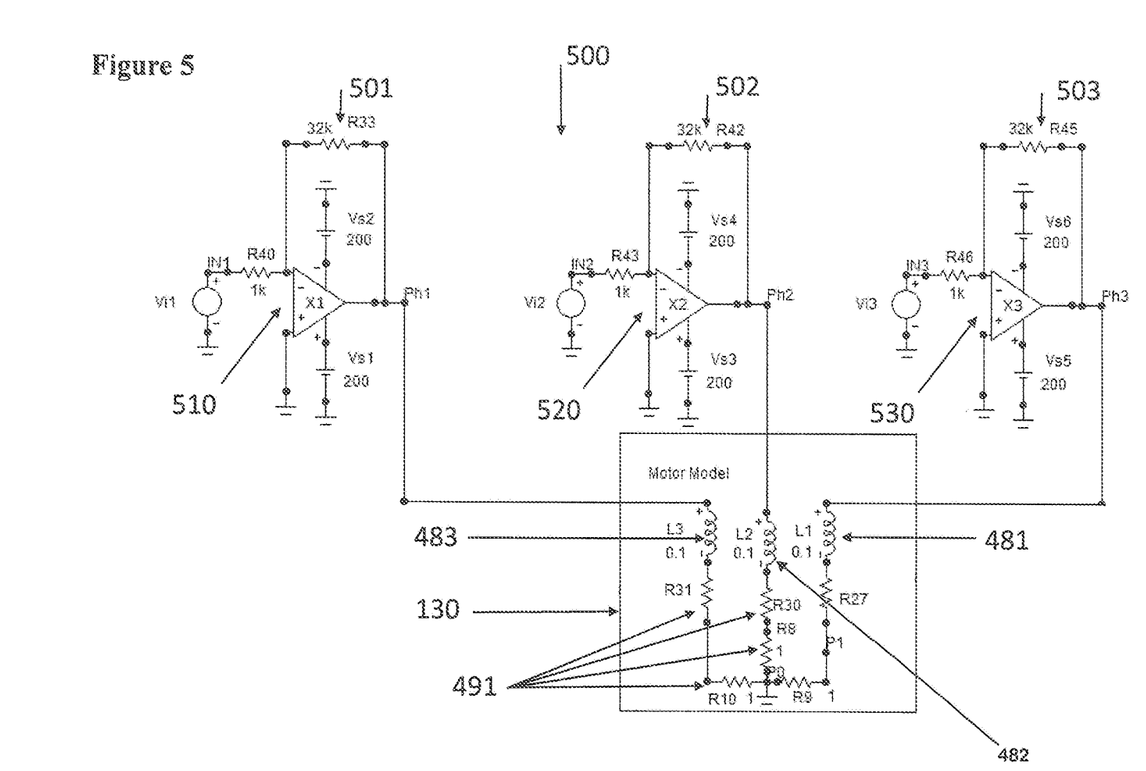
FIG. 5 is another illustration of a sample circuit diagram of an embodiment of a class AB gate driver of the present invention.

In one embodiment, the VSD 120 may be configured so that the class AB gate driver 126 is integrated with the bridge 127 using three (3) PA93 chips. In such an embodiment, where three phase power is needed to drive a motor, three chips, such as three PA93 operational amplifiers, may be used to provide three phase power to the motor. FIG. 5 is a sample circuit diagram 500 which illustrates another embodiment of class AB gate driver 126 of the present invention, with class AB gate driver 126 integrated with the bridge 127, and energizing the motor 130. The circuit diagram 500 of FIG. 5 illustrates various circuit components and various details of the various components. The various details of the various components of diagram 500 are included for illustration purposes and are not limitations of the present invention as other component values and components may be used in other embodiments. As illustrated in FIG. 5, the class AB gate driver 126 may be configured with three (3) chips 501, 502, and 503 whereby the chips may be the PA93 high voltage, low quiescent current MOSFET operational amplifier. The operational amplifiers in the three chips (501, 502, and 503) are illustrated by operational amplifiers 510, 520, and 530. The three chips will operate to provide three phase power to the motor with each chip providing one phase of power. Motor model 130 is illustrated in FIG. 5 by the inductors 481, 482, and 483 and the various resistors 491.

Figure 6:
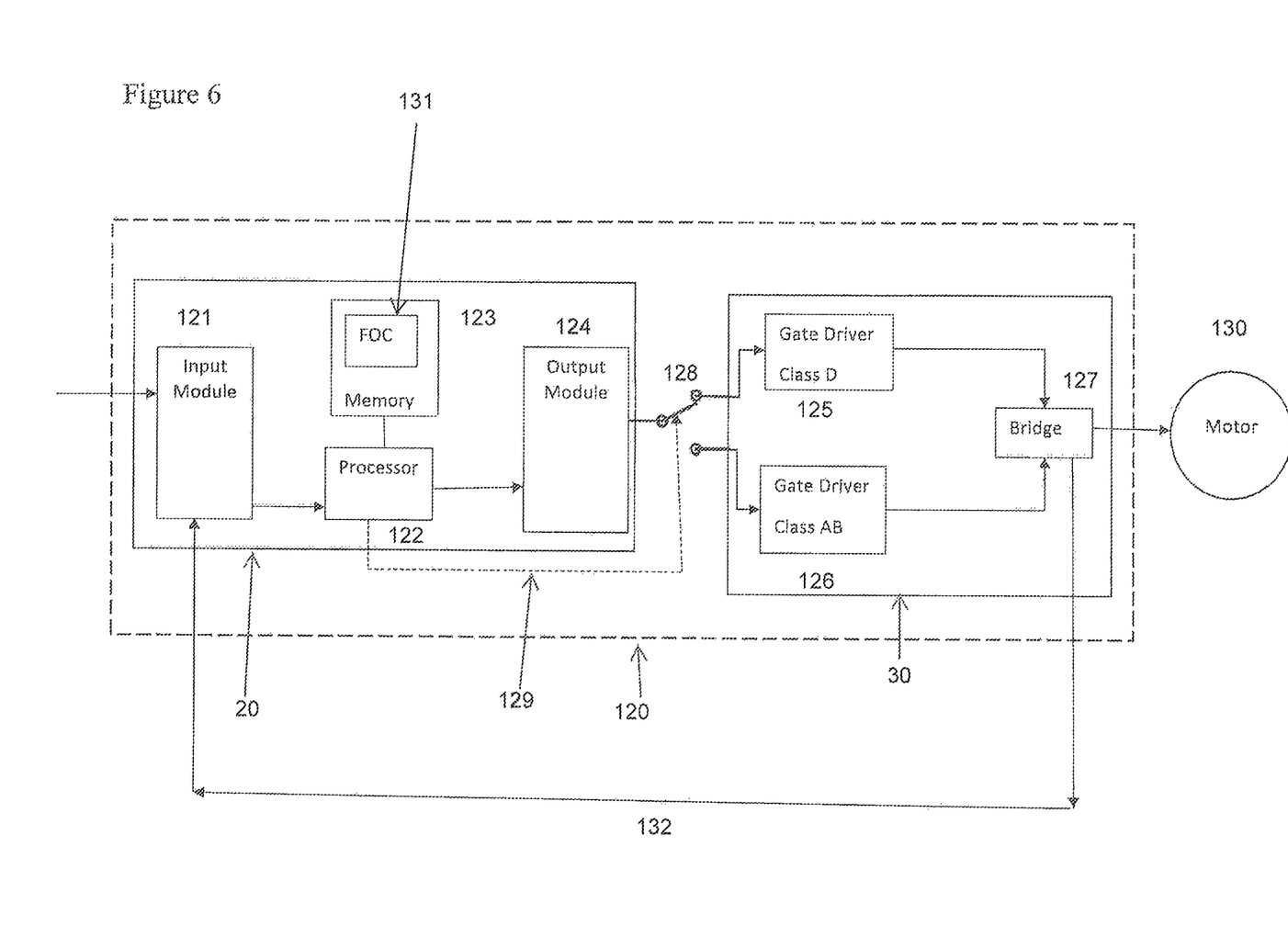
FIG. 6 is another illustration of a block diagram of an embodiment of present invention illustrating components of a variable speed drive.

In one embodiment, VSD 120 may be configured to support Field Oriented Control (FOC) methodology. FOC is used to control motors by controlling the torque and thus the speed of a motor, and controlling the current to the motor, such as motor 130. FOC may be used in controlling both an Alternating Current Induction Motor (ACIM) motor and a Direct Current Brushless (DCBL) motor. With the use of Field Oriented Control or vector control, the torque and magnetic flux can be controlled independently and the forces exerted from the stator to the rotor are controlled to produce maximum torque. FIG. 6 illustrates the block diagram of VSD 120 of FIG. 2 with the addition of FOC block 131. FOC 131 represents the Field Oriented Control algorithm that resides in memory 123 and processed by processor 122 to implement Field Oriented Control methodologies/algorithms to be used in controlling motor 130. FOC may use feedback from bridge 127 or from various sensors, such as sensor 140, and assists in controlling motor 130 to deliver torque at zero speed. As illustrated in FIG. 6, there is a link 132 illustrating that any data measured at bridge 127 is connected to input module 121 as illustrated by link 132.

In another embodiment, VSD 120 may be configured to support V/Hz algorithm to control the operation of motor 130 and will only be used when VSD 120 is used to control and operate an Alternating Current Induction Motor (ACIM) motor. V/Hz algorithm is configured with no feedback and when operating in V/Hz algorithm, sensor 140 will not be used as there is no feedback provided for this algorithm. The V/Hz algorithm may define a ratio of voltage-to-frequency for the motor 130 to follow and the V/Hz pattern, or curve, determines what voltage is output to the motor based on a given speed reference or frequency. In one embodiment, VSD 120 will allow users to select preset V/Hz patterns in configuring/programming VSD 120 for specific applications and/or for specific motors being used. In one embodiment, VSD 120 may be configured so that a user can program VSD 120 for a variable-torque load so that a variable V/Hz pattern can be used to prevent faults and increase performance and efficiency.

Figure 7:
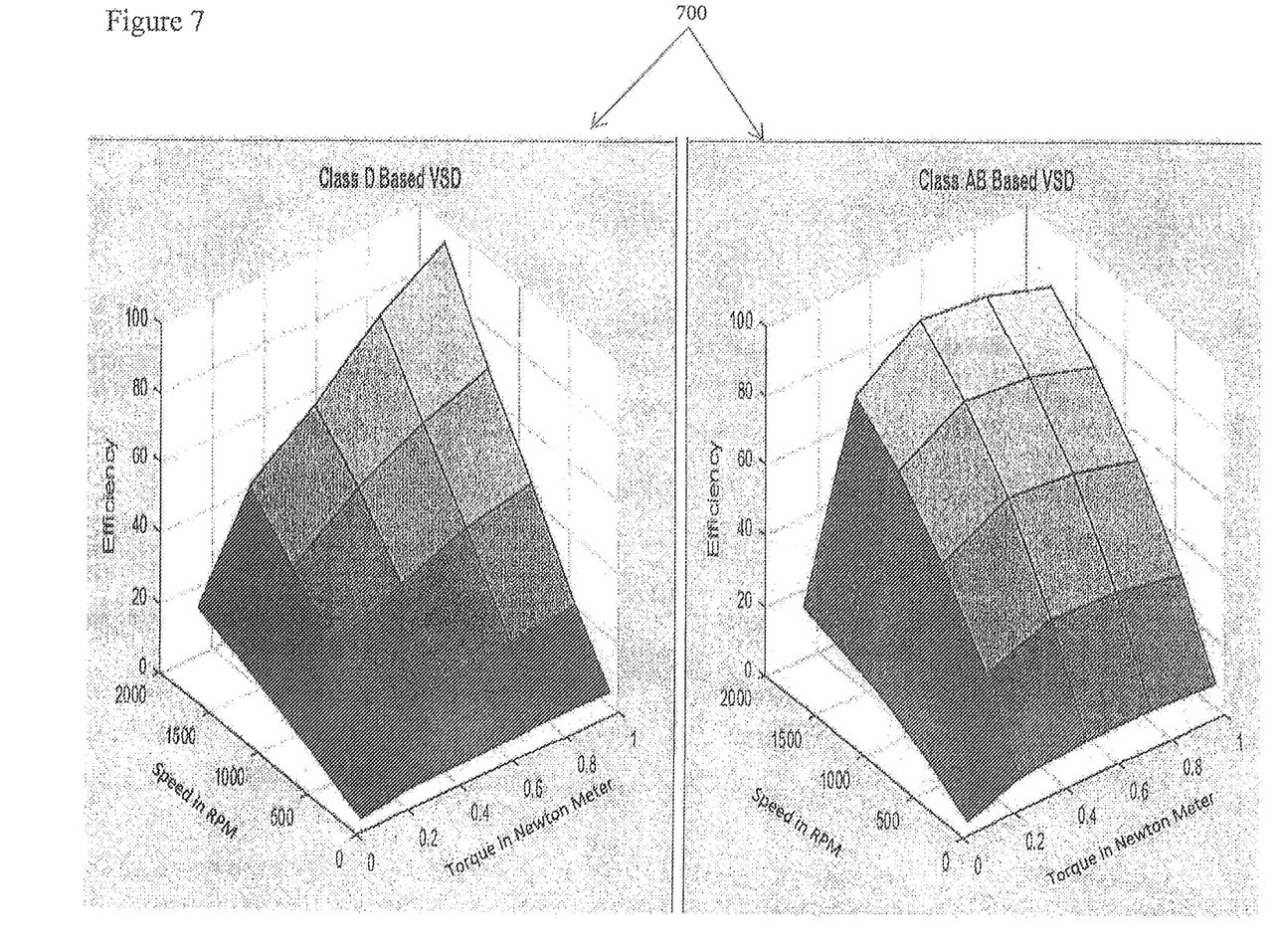
FIG. 7 is an illustration of a graph comparing efficiency of class D with class AB for an Alternating Current Induction Motor (ACIM) using the V/Hz algorithm in an embodiment of the present invention.

The increased efficiency is an advantage provided by VSD 120 as illustrated by FIG. 7. FIG. 7 illustrates a graph 700 of the comparison of efficiency of class D with class AB for an Alternating Current Induction Motor (ACIM) using the V/Hz algorithm. As illustrated in graph 700, class D illustrates a greater efficiency at higher power level. It is also clear that class AB provides higher efficiency at low power to moderate power levels. A similar comparison can be made between the class D and class AB when FOC algorithm is used.

What is claimed is:

1. A variable speed drive for controlling a motor said drive comprising:
   an embedded system block comprising:
      an input module capable of receiving inputs from a user of said variable speed drive;
      a processor for processing said inputs from said user;
      memory; and
      an output module;
   a hardware block comprising:
      a switch controlled by said processor;
      a first gate driver wherein said first gate driver is a class D gate driver;
      a second gate driver wherein said second gate driver is a class AB gate driver or a class C gate driver;
      a bridge for converting a high power DC supply to AC power to operate said motor; and
   software residing on said memory wherein said processor will execute said software to control said motor wherein said processor will generate at least one of:
      a first signal wherein when said first signal is generated, said processor will operate said switch so that said first signal can be sent to said first gate driver; or
      a second signal wherein when said second signal is generated, said processor will operate said switch so that said second signal can be sent to said second gate driver.

2. The variable speed drive of claim 1 further comprising:
   a sensor wherein said sensor can measure data comprising at least one of:
      current of said motor;
      rotor position of said motor;
      revolutions per minute of said motor;
      angular speed of said motor; or
      torque of said motor.

3. The variable speed drive of claim 2 wherein said measured angular speed and said measured torque of said motor are transmitted to said processor in real time wherein said processor will analyze said measured angular speed and torque wherein said analysis will comprise:
   multiplying said measured torque by said measured angular speed to obtain a mechanical power value;
   comparing said mechanical power value by a predetermined power level;
   generating one or more of:
      a first output to be delivered to said first gate driver; and
      a second output to be delivered to said second gate driver;
   delivering said first output to said first gate driver when said mechanical power value is greater than said predetermined power level and delivering said second output to said second gate driver when mechanical power value is less than said predetermined power level.

4. The variable speed drive of claim 3 wherein said first output is a Pulse Width Modulated (PWM) signal.

5. The variable speed drive of claim 3 wherein said second output is a 3-phase sinusoidal signal.

6. The variable speed drive of claim 3 wherein said second output is a trapezoidal signal.

7. The variable speed drive of claim 1 wherein said software residing on said memory is a V/Hz algorithm.

8. The variable speed drive of claim 2 wherein said software residing on said memory is a Field Oriented Control algorithm.

9. The variable speed drive or claim 8 wherein said processor will use said measured data in executing said Field Oriented Control algorithm.

10. The variable speed drive of claim 1 wherein said input module is a field programmable gate array.

11. The variable speed drive of claim 1 wherein said input module is comprised of discrete electronic components.

12. The variable speed drive of claim 1 wherein said output module comprises:
   a sinusoidal oscillator.

13. The variable speed drive of claim 12 wherein said sinusoidal oscillator propagates the differential equation $dx/dt = A \cdot \omega \cdot x/2$ wherein said equation is transformed to a difference equation via the Bilinear Transformation method of:

$$X(n+1) = \text{inv}(2 \cdot I - 0.5 \cdot A \cdot \omega \cdot T) \cdot (2 \cdot I + 0.5 \cdot A \cdot \omega \cdot T) \cdot X(n).$$

14. The variable speed drive of claim 1 wherein said output module generates signals to be transmitted to at least one of:
   said first gate driver; or
   said second gate driver.

15. The variable speed drive of claim 14 wherein said generated signals comprise at least one of:
   a 3-phase Pulse Width Modulation (PWM) signal;

a 3-phase sinusoidal signal; or a trapezoidal signal.

16. The variable speed drive of claim 1 wherein said processor will execute said software to generate at least one of:
- a first signal wherein when said first signal is generated, said processor will operate said switch so that said first signal can be sent to said first gate driver; or
- a second signal wherein when said second signal is generated, said processor will operate said switch so that said second signal can be sent to said second gate driver.

17. The variable speed drive of claim 16 wherein said hardware block further comprises a digital to analog converter wherein said second signal is a digital sinusoidal signal wherein said digital to analog converter will convert said digital sinusoidal signal to an analog signal to be sent to said second gate driver.

18. The variable speed drive of claim 1 wherein said bridge is a PA93 high voltage, low quiescent current MOSFET operational amplifier.

19. The variable speed drive of claim 1 wherein said second gate driver is integrated with said bridge in three PA93 high voltage, low quiescent current MOSFET operational amplifiers.

20. A system for controlling a motor comprising:
a power supply;
a variable speed drive wherein said variable speed drive comprises:
  an embedded system block comprising:
    an input module capable of receiving inputs from a user of said variable speed drive;
    a processor for processing said inputs from said user;
    memory; and
    an output module;
  a hardware block comprising:
    a switch controlled by said processor;
    a first gate driver;
    a second gate driver; and
    a bridge for converting a high power DC supply to AC power to operate said motor; and
  software residing on said memory to be executed by said processor for controlling said motor.

21. The system of claim 20 wherein said power supply outputs a low voltage to power low voltage components and a high voltage for powering said motor.

22. The system of claim 21 wherein said first gate driver is a class D gate driver.

23. The system of claim 22 wherein said second gate driver is a class AB gate driver.

24. The system of claim 22 wherein said second gate driver is a class C gate driver.

* * * * *